United States Patent [19]
Satake

[11] Patent Number: 5,992,148
[45] Date of Patent: Nov. 30, 1999

[54] RELIEF MECHANISM AND HYDRAULIC CIRCUIT EQUIPPED WITH RELIEF MECHANISM

[75] Inventor: Teruhiko Satake, Gifu, Japan

[73] Assignee: Teijin Seiki Company Limited, Osaka, Japan

[21] Appl. No.: 09/014,346

[22] Filed: Jan. 27, 1998

[30] Foreign Application Priority Data

Feb. 7, 1997 [JP] Japan .................................. 9-039821

[51] Int. Cl.$^6$ .................................................. F16D 31/02
[52] U.S. Cl. .............................................. 60/468; 60/493
[58] Field of Search .............................. 60/468, 493, 494, 60/450

[56] References Cited

U.S. PATENT DOCUMENTS

| | | | |
|---|---|---|---|
| 4,362,018 | 12/1982 | Torii | 60/493 X |
| 4,586,332 | 5/1986 | Schexnayder | 60/493 X |
| 4,628,690 | 12/1986 | Arai et al. | |
| 5,063,742 | 11/1991 | Yoshimatsu | 60/468 X |
| 5,211,015 | 5/1993 | Schroeder | 60/468 X |
| 5,531,071 | 7/1996 | Asano | 60/493 X |
| 5,772,225 | 6/1998 | Brackett | 60/468 X |

FOREIGN PATENT DOCUMENTS

| | | |
|---|---|---|
| 0 603 421 | 7/1993 | European Pat. Off. . |
| 5-94504 | 12/1993 | Japan . |
| 1 245 671 | 7/1986 | U.S.S.R. . |

Primary Examiner—Hoang Nguyen
Attorney, Agent, or Firm—Panitch Schwarze Jacobs & Nadel, P.C.

[57] ABSTRACT

If a first control valve 71 is arranged so as to change between a flow position A and a throttling position C by a fluid for switching purpose guided through a pilot channel 77, the flow area of a first intermediate channel can be changed in two steps. As a result, the injection-valve opening pressure and time of a first relief valve 48 change between two types of values, whereby the physical shock occurring when a crawler vehicle stops can be switched between two types of shock.

4 Claims, 4 Drawing Sheets

RELIEF MECHANISM AND HYDRAULIC CIRCUIT EQUIPPED WITH RELIEF MECHANISM

BACKGROUND OF THE INVENTION

The present invention relates to a relief mechanism which, when pressure in one of a pair of supply/discharge channels connecting a hydraulic actuator to a changeover valve becomes high, permits fluid to escape from the channel to the other channel, as well as to a hydraulic circuit equipped with such a relief-mechanism.

For example, a relief mechanism such as that disclosed in Japanese Utility Model Application Laid-open No. Hei-5-94504 (filed by the applicant of the present invention) has been known as an existing relief mechanism. As shown in FIG. 3, the existing relief mechanism comprises a pair of supply/discharge channels 13, 14 connecting a hydraulic motor 11 to a changeover valve 12; a connection channel 15 connecting together the supply/discharge channels 13, 14; a first relief valve 17 provided at some point in the connection channel 15; a second relief valve 20 provided at some point in the connection channel 15 in shunt with the first relief valve 17; and a cylinder 22. More specifically, for example, when the internal pressure of the supply/discharge channel 13 reaches a relief pressure level, the first relief valve 17 is opened and permits fluid to escape from the supply/discharge channel 13 to the other supply/discharge channel 14. In contrast, when the internal pressure of the supply/discharge channel 14 decreases to a given pressure level lower than-the relief pressure level, the first relief valve 17 is opened only during the time period over which the fluid is flowing to a first intermediate channel 16 from the supply/discharge channel 14, to thereby permit fluid to escape from the supply/discharge channel 14 to the supply/discharge channel 13. When the internal pressure of the supply/discharge channel 14 reaches the relief pressure level, the second relief valve 20 is opened, to thereby permit fluid to escape from the supply/discharge channel 14 to the supply/discharge channel 13. In contrast, when the internal pressure of the supply/discharge channel 13 decreases to a given pressure level lower than the relief pressure level, the second relief valve 20 is opened only during the time period over which fluid is flowing to the supply/discharge channel 14 from the supply/discharge channel 13. The cylinder 22 connects the first intermediate channel 16 to a second intermediate channel 19. When a piston 21 housed therein is moved to a stroke end as a result of being pressed by the fluid flowed from the first and second intermediate channels 16, 19, the cylinder 22 stops the influx of the fluid from the first and second intermediate channels 16, 19.

However, since the flow area of the first and second intermediate channels 16, 19 and the displacement of the cylinder 22 is constant in the foregoing existing relief mechanism, the injection-valve opening pressure and the injection-valve opening time of the first and second relief valves 17, 20 are limited to constant values.

SUMMARY OF THE INVENTION

The object of the present invention is to provide a relief mechanism capable of changing the injection-valve opening pressure and the injection-valve opening time of the first and second relief valves between two types of values, as well as to a hydraulic circuit equipped with the relief mechanism.

The foregoing object can be accomplished by provision of first and second control valves at some points in the first and second intermediate channels of the foregoing relief mechanism, these first and second control valves being capable of being switched between a flow position at which smooth flow of fluid is permitted and a throttling position at which fluid flows in a throttled manner, and by provision of a pilot channel for guiding fluid for switching purposes to the first and second control valves. Further, the object can be accomplished by providing such a relief mechanism to a hydraulic circuit equipped with a hydraulic actuator, a changeover valve, and a pair of supply/discharge channels connecting the hydraulic actuator to the changeover valve.

Assume that one of the supply/discharge channels has low pressure, and the pressure of the other supply/discharge channel is increased to a given pressure level. In this case, fluid flows to the first intermediate channel from the latter supply/discharge channel via the connection channel, and hence the first relief valve is opened and permits the fluid to escape from the latter supply/discharge channel to the former supply/discharge channel. The fluid that has escaped to the first intermediate channel flows into the cylinder by way of the first intermediate channel, pushing and actuating a piston housed in the cylinder. The piston reaches a stroke end and terminates its movement, thereby prohibiting any further influx of fluid to the cylinder. Consequently, the flow of the fluid to the first intermediate channel from the latter supply/discharge channel is terminated, and the first relief valve is closed. The injection-valve opening pressure and the injection-valve opening time of the first relief valve are determined by the flow area of the first intermediate channel and the displacement of the cylinder. As mentioned previously, according to the present invention, the relief mechanism is provided with the first and second control valves which are provided at some point in the first and second intermediate channels and are capable of being switched between a flow channel at which smooth flow of fluid is permitted and a throttling position at which fluid flows in a throttled manner. Further, the relief mechanism is provided with a pilot channel used for the purpose of introducing fluid for switching purposes to the first and second control valves. The flow area of the first intermediate channel can be changed in two steps, so long as the fluid for switching purposes is fed or discharged through the pilot channel in such a way as to switch the first control valve from the flow position to the throttling position or the throttling position to the flow position. Accordingly, the injection-valve opening pressure and the injection-valve opening time of the first relief valve can be switched in two steps. The same applies to the second relief valve.

With the configuration as described in claim 2, the relief mechanism requires only one cylinder and, therefore, can be made simple in structure and compact.

Further, with the configuration as described in claim 4, the displacement of a variation displacement hydraulic motor and the injection-valve opening pressure and injection-valve opening time of the relief valve can be simultaneously switched, thereby rendering switching operations easy and simplifying the structure of the relief mechanism.

DETAILED DESCRIPTION OF THE PREFERRED EMBODIMENTS

By reference to the accompanying drawings, a first embodiment of the present invention will be described hereinbelow.

Figure 1:
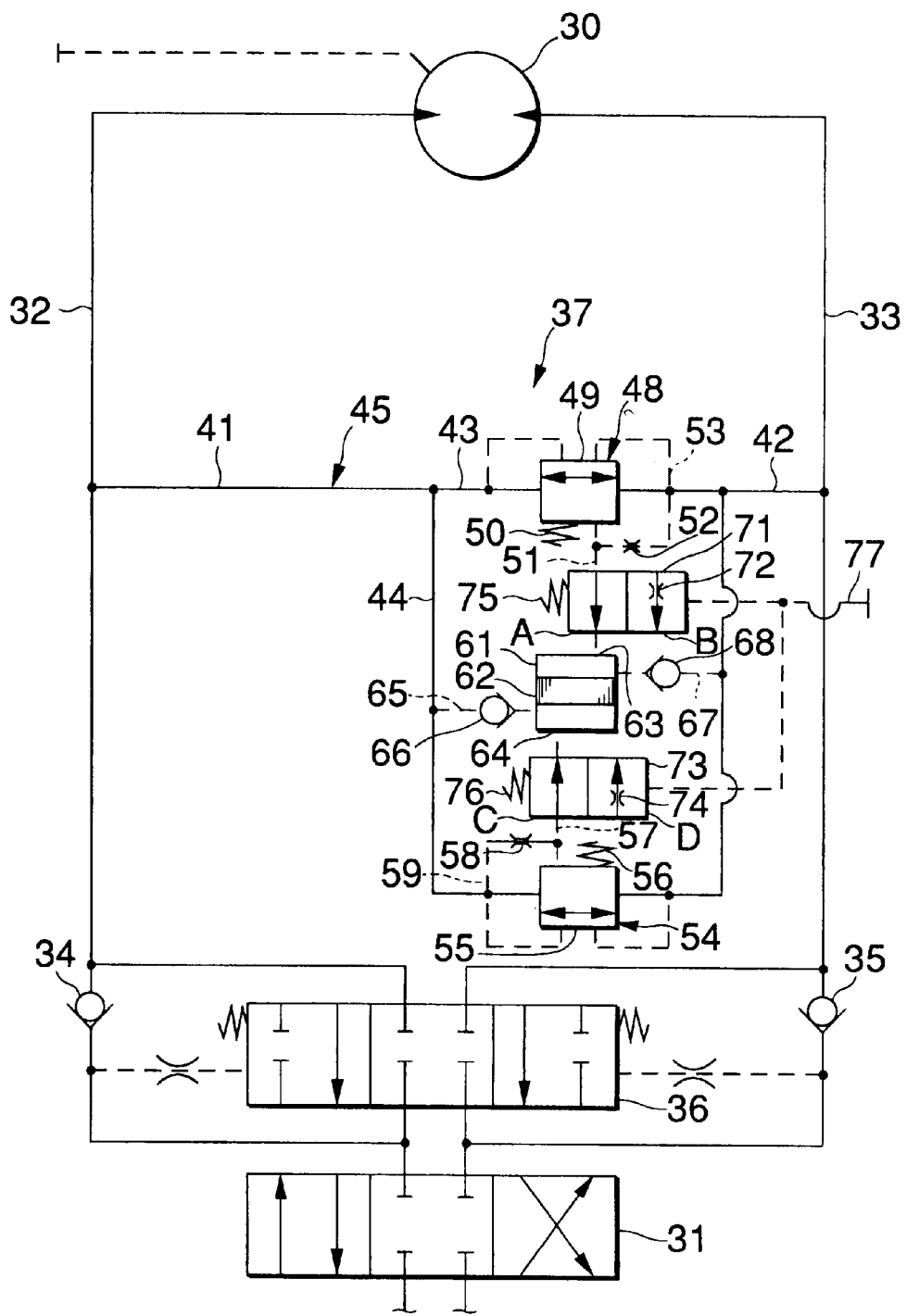
FIG. 1 is a circuit diagram showing a hydraulic circuit according to a first embodiment of the present invention.

In FIG. 1, reference numeral 30 designates a fixed displacement hydraulic motor which servers as a hydraulic actuator used for actuating; e.g., a crawler vehicle such as a power shovel. The hydraulic motor 30 is connected to a changeover valve 31 by means of a pair of supply/discharge channels 32, 33. When the changeover valve 31 is switched, high-pressure fluid discharged from an unillustrated pump is fed to either the supply/discharge channel 32 or the supply/discharge channel 33. At this time, low-pressure return fluid returns to an unillustrated tank via the remaining channel of the supply/discharge channels 32 and 33. A counter balance valve 36 equipped with check valves 34, 35 is provided at some points in the supply/discharge channels 32, 33, and a relief mechanism 37 is connected to the supply/discharge channels 32, 33 between the counter balance valve 36 and the hydraulic motor 30.

The relief mechanism 37 comprises a channel 41 connected to the supply/discharge channel 32 and a channel 42 connected to the supply/discharge channel 33. Both ends of first and second parallel channels 43, 44 connected in shunt with each other are connected to the channels 41, 42. The channels 41, 42 and the first and second parallel channels 43, 44, as a whole, constitute a connection path 45 which connects together the supply/discharge channels 32, 33. A first relief valve 48 is provided at some point in the first parallel channel 43. When the internal pressure of the supply/discharge channel 32 reaches a relief pressure level, a spool 49 is pushed by the hydraulic pressure fed through the channel 41 and is moved while compressing a spring 50, thereby opening the first relief valve 48. As a result, fluid under the relief pressure is allowed to escape to the supply/discharge channel 33 from the supply/discharge channel 32. The first intermediate channel 51 connected to the first relief valve 48 is connected to the channel 42 via a throttling channel 53 having a throttle 52 provided at some point therein. Accordingly, fluid can flow to the first intermediate channel 51 from the channel 42 via the throttling channel 53. At this time, a pressure drop occurs across the spool 49. When the internal pressure of the supply/discharge channel 33 decreases to a given pressure level lower than the relief pressure, the first relief valve 48 is opened only during the time period over which fluid is flowing to the first intermediate channel 51 from the supply/discharge channel 33, thereby permitting fluid to escape to the supply/discharge channel 32 from the supply/discharge channel 33. In contrast, a second relief valve 54 is provided at some point in the second parallel channel 44. When the internal pressure of the supply/discharge channel 33 reaches the relief pressure, a spool 55 is pushed by the hydraulic pressure fed through the channel 42 and is moved while compressing a spring 56, thereby opening the second relief valve 54. As a result, fluid under the relief pressure escapes to the supply/discharge channel 32 from the supply/discharge channel 33. A second intermediate channel 57 connected to the second relief valve 54 is connected to the channel 41 via a throttling channel 59 having a throttle 58 provided at some point therein. When fluid flows to the second intermediate channel 57 from the inside of the supply/discharge channel 32 via the throttling channel 59, a pressure drop arises across the throttling channel 59. When the internal pressure of the supply/discharge channel 32 drops to a given pressure level lower than the relief pressure, the second relief valve 54 is opened only during the time period over which fluid is flowing to the second intermediate channel 57 from the supply/discharge channel 32, thereby allowing fluid to escape from the supply/discharge channel 32 to the supply/discharge channel 33.

Reference numeral 61 designates a cylinder in which one piston 62 is housed in a slidable manner. The first intermediate channel 51 is connected to a supply/discharge port 63 formed at one end of the cylinder 61, and the second intermediate channel 52 is connected to a supply/discharge port 64 formed at the other-end of the cylinder 61. In this way, since the first and second intermediate channels 51, 57 are connected to the cylinder 61, the cylinder 61 is shared between the first relief valve 48 and the second relief valve 54. The foregoing configuration requires only one cylinder 61, which in turn makes it possible to realize the compact relief mechanism 37 having a simple structure. The piston 62 is pushed and actuated to the end by the fluid supplied from the first intermediate channel 51. When the piston 62 reaches and stops at the end as a result of actuation, the fluid cannot flow into the cylinder 61 any further, thereby stopping the flow of the fluid within the first intermediate channel 51. In contrast, the piston 62 is pushed and actuated by the other end by the fluid supplied from the second intermediate channel 57. When the piston 62 reaches and stops at the other end as a result of actuation, the flow of the fluid within the second intermediate channel 57 is stopped, as is the fluid in the first intermediate channel 51. As mentioned previously, when it becomes difficult for the fluids to flow through the first and second intermediate channels 51, 57, equal pressure is produced across the spools 49, 55 of the first and second relief valves 48, 54, thereby closing the first and second relief valves 48, 54. Reference numeral 65 designates a return channel which connects one end of the cylinder 61 to the second parallel channel 44 connected to one end of the second relief valve 54. When the piston 62 is moved to the end, a return fluid is discharged. A check valve 66 is provided at some point in the return channel 65. Reference numeral 67 designates a return channel which connects the other end of the cylinder 61 to the second parallel channel 44 connected to the second relief valve 54. A check valve 68 is provided at some point in the return channel 67.

A first control valve 71 is provided at some point in the first intermediate channel 51 and is capable of being switched between a flow position A at which the control valve permits smooth flow of a fluid and a throttling position B at which the control valve permits the flow of the fluid while throttling through use of a restrictor 72 provided within the control valve 71. A second valve 73 is provided at some point in the second intermediate channel 57 and is capable of being switched between a flow position C at which the control valve permits smooth flow of a fluid and a throttling position D at which the control valve permits the flow of the fluid while throttling through use of a restrictor 74 provided within the control valve 73. The first control valve 71 has a spring 75 used for pushing the first control valve 71 toward the flow position A, and the second control valve 73 has a spring 76 used for pushing the second control valve 73 toward the flow position C. Further, the first control valve 71 is connected to a pilot channel 77 which guides a fluid for switching purpose (hereinafter simply referred to as "a switching-fluid") so as to push the first control valve 71 toward the throttling position B, and the second control valve 73 is connected to the pilot channel 77 which guides the switching fluid so as to push the second control valve 73 toward the throttling position D. The pilot channel 77 bifurcates at some point along the way to the first and second control valves 71, 73 and the bifurcated channels are connected at the front ends to the first and second control valves 71, 73, respectively. When the switching fluid is not guided through the pilot channel 77, the first and second control valves 71, 73 are held in the flow positions A, C by means of the pressing force of the springs 75, 76. In contrast, when a high-pressure switching fluid is guided through the pilot channel 77, the force of the fluid surpasses the pressing force of the springs 75, 76, thereby switching the first and second control valves 71, 73 to the throttling positions B, D.

The operation of the hydraulic circuit according to the first embodiment of the present invention will now be described.

Assume that the changeover valve 31 is in a parallel flow position, so that the high-pressure fluid discharged from the hydraulic pump is fed to the hydraulic motor 30 through the supply/discharge channel 32, thereby rotating the hydraulic motor 30 and driving the crawler vehicle. In this case, a low-pressure return fluid that has flowed from the hydraulic motor 30 returns to the tank through the supply/discharge channel 33 and the counter balance valve 36. As mentioned previously, if the internal pressure of the supply/discharge channel 32 is increased for some reason while the hydraulic motor 30 is rotating, the first relief valve 48 is opened when receiving the internal pressure of the supply/discharge channel 32, thereby permitting the high-pressure fluid to escape to the supply/discharge channel 33 from the supply/discharge channel 32. Although the relief pressure within the supply/discharge channel 32 is also guided to the second relief valve 54, a fluid cannot flow through the inside of the second intermediate channel 57 because the piston 62 of the cylinder 61 has already moved to and stopped at one stroke end. Consequently, the fluid cannot flow through the inside of the second intermediate channel 57, so that the second relief valve 54 does not open even if the internal pressure of the supply/discharge channel 32 is increased to a pressure level greater than a given pressure, or the relief pressure in this case.

If the changeover valve 31 is switched to a neutral position from the parallel flow position in this state, the counter balance valve 36 returns to a neutral position, thereby interrupting the flow of the fluid within the supply/discharge channels 32, 33. At this time, the hydraulic motor 30 continues rotating by means of inertial force and attempts to continually drive the crawler vehicle. To prevent the continual driving of the crawler vehicle, the hydraulic motor 30 performs a pumping operation so as to draw the fluid from the supply/discharge channel 32 and to discharge the thus-withdrawn fluid to the supply/discharge channel 33. As a result, the pressure within the supply/discharge channel 32 is decreased, whereas the pressure within the supply/discharge channel 33 is increased. The fluid under such increased pressure flows into the cylinder 61 from the supply/discharge port 63 after having flowed through the throttling channel 53 and the first intermediate channel 51, thereby actuating the piston 62 to the opposite end. Consequently, a pressure drop occurs across the spool 49 of the first relief valve 48. When the internal pressure of the supply/discharge channel 33 is increased to a given pressure level, the hydraulic force exerted on the spool 49 increases and exceeds the pressing force of the spring 50, thereby opening the first relief valve 48. Subsequently, when the piston 62 moves to and is stopped at the opposite stroke end, further influx of the fluid to the cylinder 61 is prevented. Accordingly, the flow of the fluid to the first intermediate channel 51 from the supply/discharge channel 33 is stopped, thereby closing the first relief valve 48. As mentioned previously, the opening pressure of the first relief valve 48 is smaller than the relief pressure, and hence physical shock caused when the crawler vehicle is stopped can be reduced.

When the switching fluid is not guided through the pilot channel 77, the first control valve 71 is held in the flow position A by means of the pressing force of the spring 75. Consequently, the fluid that has entered the first intermediate channel 51 flows into the cylinder 61 without being interrupted. In contrast, when the switching fluid is guided through the pilot channel 77, the first control valve 71 is held in the throttling position B by means of the hydraulic force of the switching fluid. Because of this, the fluid that has entered the first intermediate channel 51 flows into the cylinder 61 while being throttled by means of the restrictor 72. As mentioned previously, if the first control valve 71 is switched between two positions; namely, the flow position A and the throttling position B, through use of the switching fluid guided through the pilot channel 77, the flow area of the first intermediate channel 51 can be switched in two steps. The injection-valve opening pressure (given pressure) of the first relief valve 48 becomes higher than that obtained when the first control valve 71 is held in the flow position A. Further, the injection-valve opening time of the first relief valve 48 becomes shorter than that required when the first control valve 71 is held in the flow position A. As a result, the foregoing shock-reducing effect can be switched in two steps according to a variation in a working environment or to preferences of the operator. If the restrictors 72, 74 are replaceable, the injection-valve opening pressure and time of the first and second relief valves 48, 54 can be readily changed to desired values.

The hydraulic circuit operates in the same manner as mentioned previously even when the changeover valve 31 is switched to a neutral position when the high-pressure fluid is supplied to the supply/discharge channel 33. In this case, when the internal pressure of the supply/discharge channel 32 reaches a given pressure level, the second relief valve 54 is opened only the time period over which the fluid is flowing through the inside of the second intermediate channel 57, thereby permitting the fluid to escape to the supply/discharge channel 33 from the supply/discharge channel 32. The injection-valve opening pressure and time of the second relief valve 54 can be switched in two steps according to the position of the second control valve 73 in the same manner as mentioned previously.

Figure 2:
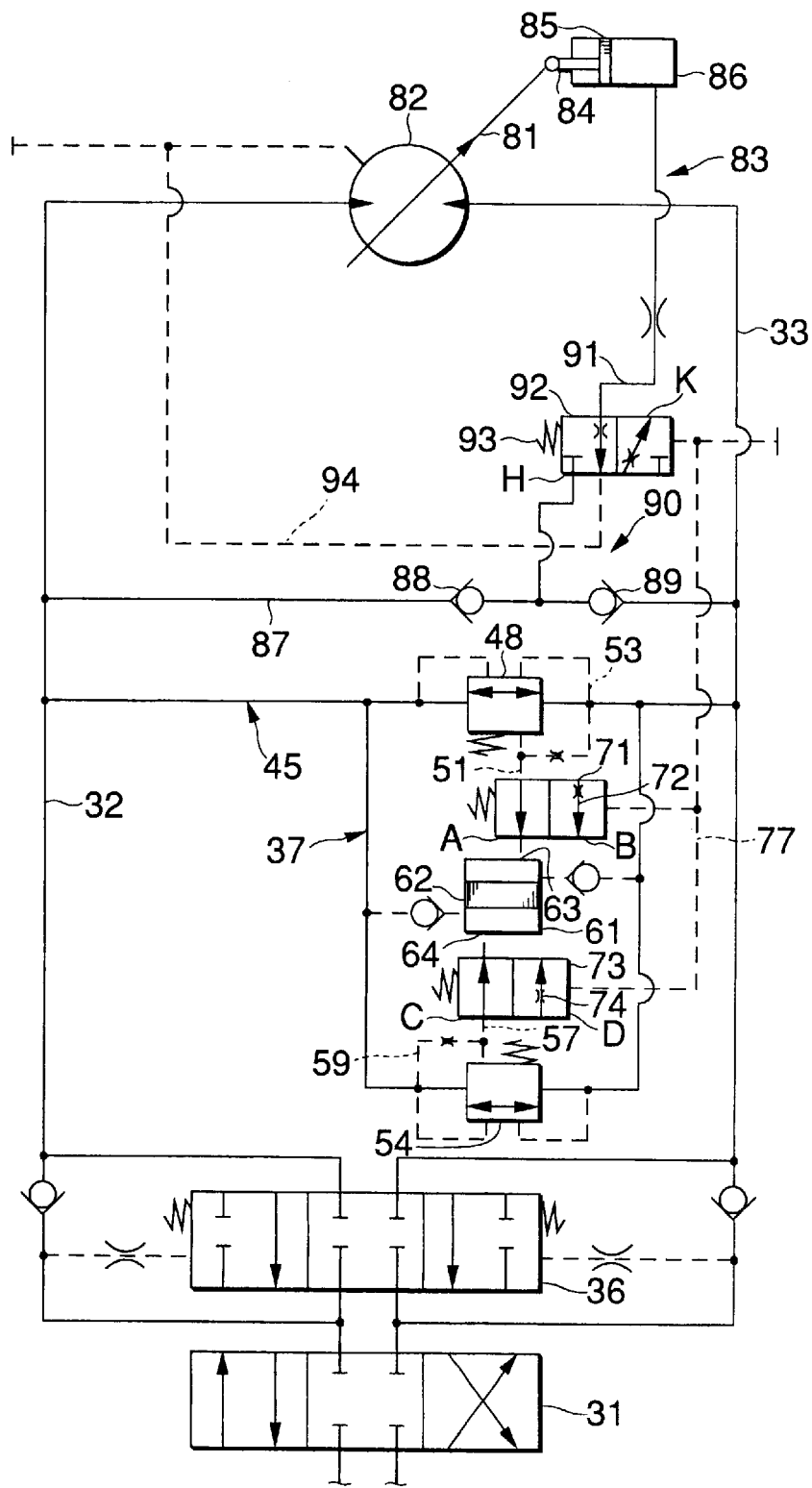
FIG. 2 is a circuit diagram showing a hydraulic circuit according to a second embodiment of the present invention.
Figure 3:
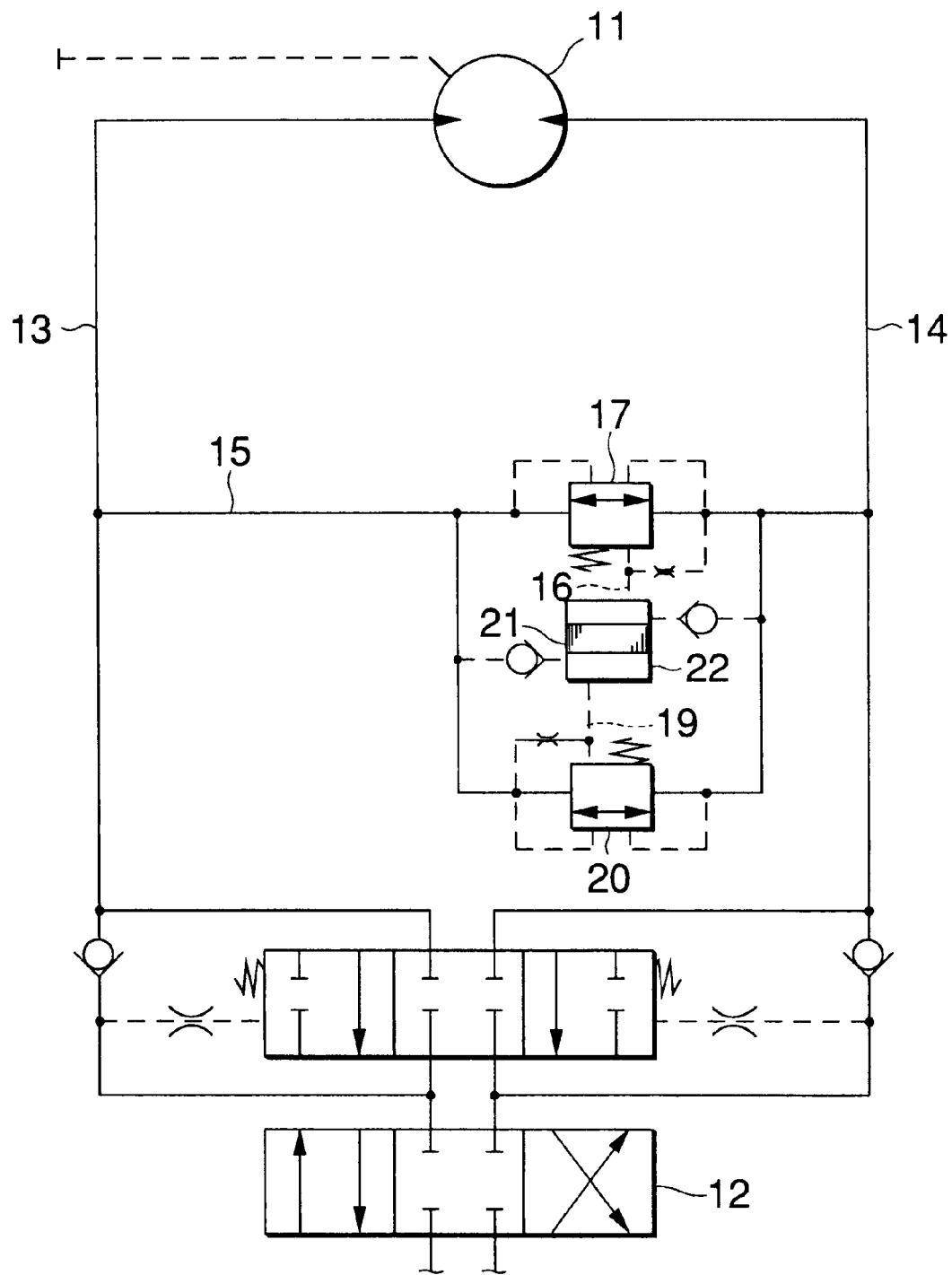
FIG. 3 is a circuit diagrams showing one example of an existing relief mechanism.

FIG. 2 shows a hydraulic circuit according to a second embodiment of the present invention. In this embodiment, there is used as a hydraulic actuator a variation displacement (swash plate) hydraulic motor 82 whose displacement changes in two steps as a result of a change in the position (i.e., a change in the tilt angle) of a swash plate 81. The tilt angle of the swash plate 81 is changed by means of change means 83. This change means 83 comprises a displacement cylinder 86 which tilts the swash plate 81 in two steps by means of actuation of the piston 85; a selection valve 90 which includes a pair of check valves 88, 89 provided at some points along a selection channel 87 connecting together the supply/discharge channels 32, 33 and selectively acquire a high-pressure fluid from the supply/discharge channels 32, 33; a connection channel 91 which connects the displacement cylinder 86 to the selection valve 90, more particularly, the check valve 88 to the check valve 89; and a hydraulic changeover valve 92 provided at some point in the connection channel 91. The foregoing pilot channel 77 is connected to the hydraulic changeover valve 92. In a case where a switching fluid is not guided through the pilot channel 77, the hydraulic changeover valve 92 is switched to a discharge position H by means of the pressing force of a spring 93. In contrast, in a case where a switching fluid is guided through the pilot channel 77, the hydraulic changeover valve 92 is switched to a feed position K by means of the hydraulic force. When the hydraulic changeover valve 92 is switched to the discharge position H in the manner as mentioned previously, the fluid held within the displacement cylinder 86 is-discharged to a drain channel 94, so that the piston rod 84 is withdrawn. As a result, the swash plate 81 is inclined in such a way as to increase its tilt angle, whereby the hydraulic motor 82 rotates at low speed. In contrast, if the hydraulic changeover valve 92 is switched to the feed position K, a high-pressure fluid is fed to the displacement cylinder 86. Consequently, the piston rod 84 protrudes, and the swash plate 81 is inclined in such a way as to decrease its tilt angle. Accordingly, the hydraulic motor 82 rotates at high speed. In this case, if the pilot channel 77 which switches between the first and second control valves 71, 73 is connected to the hydraulic changeover valve 92 to thereby switch the hydraulic changeover valve 92, the displacement of the hydraulic motor 82 and the injection-valve opening pressure and time of the first and second relief valves 48, 54 can be switched simultaneously, thereby rendering a switching operation easy, as well as rendering the structure of the hydraulic circuit simple. In other respects, the hydraulic circuit according to the second embodiment is the same in structure as that employed in the first embodiment.

In the foregoing hydraulic circuit, provided that the changeover valve 31 is switched to a parallel flow position, and that, as a result of introduction of the switching fluid through the pilot channel 77, the first control valve 71 is switched to the throttling position B and the hydraulic changeover valve 92 is switched-to the feed position K, the high-pressure fluid held within the supply/discharge channel 32 flows into the displacement cylinder 86 through the election channel 87 and the connection channel 91, thereby inclining the swash plate 81 of the hydraulic motor 82 in such a way as to decrease its tilt angle. Accordingly, the high-pressure fluid supplied to the supply/discharge channel 32 causes the hydraulic motor 82 to rotate at high speed, thereby driving the crawler vehicle at high speed. If the changeover valve 31 is switched to a neutral position in this state, the hydraulic motor 82 performs a pumping operation, so that the internal pressure in the supply/discharge channel 33 is increased as in the case of the first embodiment. The fluid whose pressure is thus increased flows into the cylinder 61 by way of the throttling channel 53 and the first intermediate channel 51, thereby actuating the piston 62 to the opposite end. When the internal pressure of the supply/discharge channel 33 is increased to a first given pressure level, the first relief valve 48 is opened to thereby permit the fluid held within the supply/discharge channel 33 to escape to the supply/discharge channel 32. As a result, physical shock occurring when the crawler vehicle stops is reduced.

In the foregoing hydraulic circuit, provided that the changeover valve 31 is switched to the parallel flow position, that a switching fluid is not guided to the pilot channel 77, and that the first control valve 71 is switched to the flow position A and the hydraulic changeover valve 92 is switched to the discharge position H, the piston rod 84 of the displacement cylinder 86 is withdrawn to thereby incline the swash plate 81 of the hydraulic motor 82 in such a way as to increase its tilt angle. The high-pressure fluid supplied to the supply/discharge channel 32 causes the hydraulic motor 82 to rotate at low speed, thereby driving the crawler vehicle at low speed. If the changeover valve 31 is switched to the neutral position in this state, the fluid whose pressure is thus increased by means of the pumping action of the hydraulic motor 82 flows into the cylinder 61 via the throttling channel 53 and the first intermediate channel 51, thereby actuating the piston 62 to the opposite end. If the first control valve 71 is temporarily switched to the throttling position B, as in the previous embodiment, the injection-valve opening pressure of the first relief valve 48 is the same as the first given pressure, as in the case of the previous embodiment. Further, because the crawler vehicle travels at low speed, the traveling energy of the crawler vehicle is small. For this reason, the injection-valve opening time is correspondingly reduced, and the physical shock occurring when the crawler vehicle stops is the same as that generated in the foregoing embodiment. However, the first control valve 71 is switched to the flow position A in the manner as mentioned previously in the second embodiment. Therefore, in comparison with the case in which the first control valve 71 is held in the throttling position B, a larger amount of fluid can flow smoothly into the first intermediate channel 51. As a result, the injection-valve opening pressure of the first relief valve 48 is reduced to a second given pressure level lower than the first given pressure level. Further, the injection-valve opening time of the first relief valve 48 is increased corresponding to the reduction in the injection-valve opening pressure. For these reasons, the physical shock occurring when the crawler vehicle stops can be reduced to a much greater extent in comparison with the physical shock occurring when the crawler vehicle actuated at high speed is stopped. In other respects, the hydraulic circuit operates in the same way as does the hydraulic circuit in the first embodiment.

Figure 4:
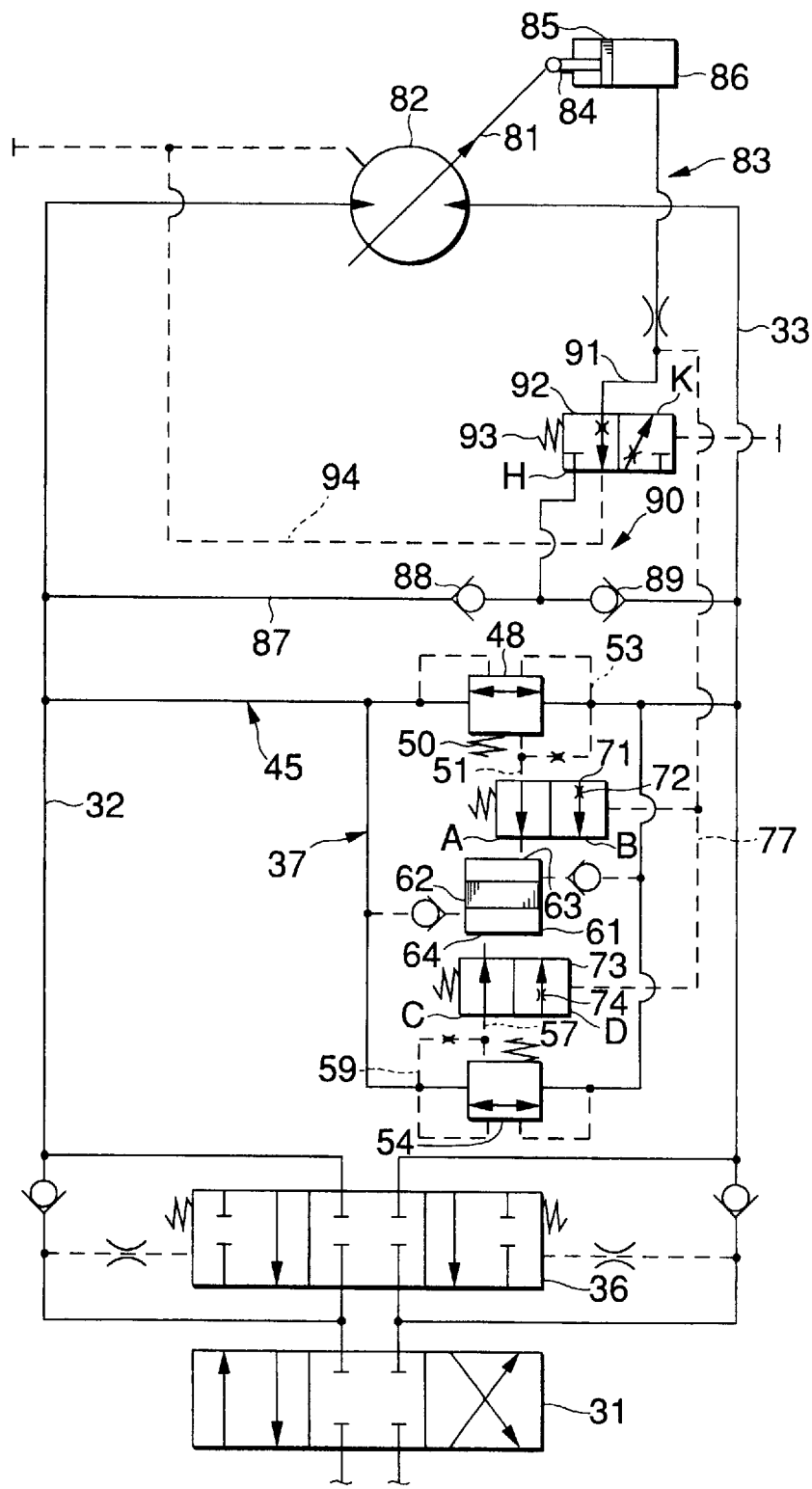
FIG. 4 is a circuit diagram showing a hydraulic circuit according to a third embodiment of the present invention.

In addition, the pilot channel 77 may be connected to the connection channel 91 as shown in FIG. 4.

Although a fixed displacement pump or a variation displacement pump is used as the hydraulic actuator in the foregoing embodiments, a reciprocating cylinder used for raising or lowering an arm of a wheel loader may be used as the hydraulic actuator of the present embodiment. Further, although the connection channel 45 is formed from one channel having a bifurcation and the first and second relief valves 48, 54 are provided at the bifurcation, the supply/discharge channels 32, 33 may be connected together by means of two channels (so as to constitute a connection channel as a whole), and the first and second relief valves may be provided in the respective channels. Still further, although one cylinder 61 is shared between the fist and second relief valves 48, 54 in the previous embodiment, two cylinders may be provided so as to correspond to the respective first and second relief valves. In the previous embodiment, although the first and second control valves 71, 73 are switched to the throttling positions B, D when the switching fluid is supplied through the pilot channel 77 while they are switched to the flow positions A, C when the switching fluid is not supplied, the first and second control valves 71, 73 may be switched to the flow positions when the switching fluid is supplied through the pilot channel and switched to the throttling positions when the switching fluid is not supplied.

In addition, the changeover valve used in this application may be referred to as a directional control valve.

As mentioned previously, according to the present invention, the injection-valve opening pressure and time of the first and second relieve valves can be changed between two types of valves.

What is claimed is:

1. A relief mechanism including a pair of supply/discharge channels connecting a hydraulic actuator to a changeover valve;

a connection channel connecting together the supply/discharge channels;

a first relief valve provided at some point in the connection channel; wherein when the internal pressure of one supply/discharge channel reaches a relief pressure level, the first relief valve is opened and permits fluid to escape from the supply/discharge channel to the other supply/discharge channel, whereas when the internal pressure of the latter supply/discharge channel decreases to a given pressure level lower than the relief pressure level, the first relief valve is opened only during the time period over which the fluid is flowing to a first intermediate channel from the latter supply/discharge channel, to thereby permit fluid to escape from the latter supply/discharge channel to the former supply/discharge channel;

a second relief valve provided at some point in the connection channel in shunt with the first relief valve, wherein when the internal pressure of the latter supply/discharge channel reaches the relief pressure level, the second relief valve is opened, to thereby permit fluid to escape from the latter supply/discharge channel to the former supply/discharge channel, whereas when the internal pressure of the former supply/discharge channel decreases to a given pressure level lower than the relief pressure level, the second relief valve is opened only during the time period over which fluid is flowing to the latter supply/discharge channel from the former supply/discharge channel; and a cylinder connecting the first intermediate channel to a second intermediate channel, wherein when a piston housed therein is moved to a stroke end as a result of being pressed by the fluid that has flowed from the first and second intermediate channels, the cylinder stops the influx of the fluid from the first and second intermediate channels, the improvement being characterized by comprising:

first and second control valves which are provided at some points in the first and second intermediate channels of the foregoing relief mechanism and can be switched between a flow position at which smooth flow of fluid is permitted and a throttling position at which fluid flows in a throttled manner; and a pilot channel for guiding fluid for switching purposes to the first and second control valves.

2. The relief mechanism as defined in claim 1, wherein the cylinder is used as a shared cylinder housing one piston therein, and wherein the first intermediate channel is connected to one of supply/discharge ports of the cylinder, and the second intermediate channel is connected to the other supply/discharge port.

3. A hydraulic circuit equipped with a relief mechanism comprising:

a hydraulic actuator;

a changeover valve; and a pair of supply/discharge channels connecting the hydraulic actuator to the changeover valve; and a relief mechanism which permits fluid from any one of the supply/discharge channels to the other supply/discharge channel and comprises a connection channel connecting together the supply/discharge channels;

a first relief valve provided at some point in the connection channel; wherein when the internal pressure of one supply/discharge channel reaches a relief pressure level, the first relief valve is opened and permits fluid to escape from the supply/discharge channel to the other supply/discharge channel, whereas when the internal pressure of the latter supply/discharge channel decreases to a given pressure level lower than the relief pressure level, the first relief valve is opened only during the time period over which the fluid is flowing to a first intermediate channel from the latter supply/discharge channel, to thereby permit fluid to escape from the latter supply/discharge channel to the former supply/discharge channel;

a second relief valve provided at some point in the connection channel in shunt with the first relief valve, wherein when the internal pressure of the latter supply/discharge channel reaches the relief pressure level, the second relief valve is opened, to thereby permit fluid to escape from the latter supply/discharge channel to the former supply/discharge channel, whereas when the internal pressure of the former supply/discharge channel decreases to a given pressure level lower than the relief pressure level, the second relief valve is opened only during the time period over which fluid is flowing to the latter supply/discharge channel from the former supply/discharge channel;

a cylinder connecting the first intermediate channel to a second intermediate channel, wherein when a piston housed therein is moved to a stroke end as a result of being pressed by the fluid flowed from the first and second intermediate channels, the cylinder stops the influx of the fluid from the first and second intermediate channels;

first and second control valves which are provided at some points in the first and second intermediate channels of the foregoing relief mechanism and can be switched between a flow position at which smooth flow of fluid is permitted and a throttling position at which fluid flows in a throttled manner; and a pilot channel for guiding fluid for switching purpose to the first and second control valves.

4. The hydraulic circuit equipped with the relief mechanism as defined in claim 3, wherein a variation displacement hydraulic motor which changes its displacement in two steps according to the positional displacement of a displacement change member is used as the hydraulic actuator; wherein there is provided a connection path which connects a displacement cylinder used for the purpose of displacing the position of the displacement change member to a selection valve used for selecting and acquiring fluid from the high-pressure supply/discharge channel; and wherein the pilot channel is connected to the fluid changeover valve provided at some point in the connection path, whereby the fluid changeover valve is switched by the fluid guided through the pilot channel, and high-pressure fluid is fed to the displacement cylinder, or fluid is discharged from the displacement cylinder.

* * * * *